United States Patent
Hopkins

(10) Patent No.: US 7,955,049 B2
(45) Date of Patent: Jun. 7, 2011

(54) SEAL BETWEEN RELATIVELY MOVEABLE MEMBERS

(75) Inventor: Noel P Hopkins, Derby (GB)

(73) Assignee: Rolls-Royce PLC, London (GB)

(*) Notice: Subject to any disclaimer, the term of this patent is extended or adjusted under 35 U.S.C. 154(b) by 782 days.

(21) Appl. No.: 11/808,885

(22) Filed: Jun. 13, 2007

(65) Prior Publication Data

US 2008/0014077 A1  Jan. 17, 2008

(30) Foreign Application Priority Data

Jul. 11, 2006  (GB) .................................. 0613715.2

(51) Int. Cl.
*F01D 11/08* (2006.01)
*F01D 11/12* (2006.01)

(52) U.S. Cl. .................................. 415/173.4; 415/174.4

(58) Field of Classification Search ............... 415/173.4, 415/174.4, 229; 29/889.2
See application file for complete search history.

(56) References Cited

U.S. PATENT DOCUMENTS

| | | | |
|---|---|---|---|
| 3,092,306 A | 6/1963 | Eder | |
| 4,218,066 A | 8/1980 | Ackermann | |
| 4,229,491 A * | 10/1980 | Dislich et al. | 427/160 |
| 4,257,735 A | 3/1981 | Bradley et al. | |
| 4,460,185 A * | 7/1984 | Grandey | 277/415 |
| 5,024,884 A * | 6/1991 | Otfinoski | 428/328 |
| 5,314,304 A | 5/1994 | Wiebe | |
| 5,326,633 A * | 7/1994 | Clough et al. | 442/110 |
| 5,326,647 A * | 7/1994 | Merz et al. | 428/605 |
| 6,334,617 B1 * | 1/2002 | Putnam et al. | 277/415 |
| 6,887,530 B2 * | 5/2005 | Fiala et al. | 427/456 |
| 7,008,462 B2 * | 3/2006 | Fiala et al. | 75/252 |
| 7,135,240 B2 * | 11/2006 | Fiala et al. | 428/680 |
| 7,179,507 B2 * | 2/2007 | Fiala et al. | 427/455 |

* cited by examiner

*Primary Examiner* — Edward Look
*Assistant Examiner* — Sean J Younger
(74) *Attorney, Agent, or Firm* — Oliff & Berridge PLC

(57) ABSTRACT

A seal (48) between first and second relatively rotatable members (26,28). The seal comprises an abradable material on at least one of the relatively rotatable members (26,28). The abradable material comprises an open cell metallic foam (60) and polymeric films (64) closing the cells (62) of the metallic foam (60). The seal (48) is used between compressor rotor blades (26) and a stator casing (28) of a gas turbine engine (10). The seal (48) combines the sealing properties of a closed cell metallic foam with the abradability and manufacturing control of open cell metallic foam.

12 Claims, 2 Drawing Sheets

SEAL BETWEEN RELATIVELY MOVEABLE MEMBERS

The present invention relates to a seal between relatively movable members, preferably between first and second relatively rotatable members, in particular a rotor and a stator, more particularly to a seal between a compressor rotor blade and a compressor casing of a turbomachine, for example a gas turbine engine.

A compressor of a gas turbine engine comprises one or more stages of compressor rotor blades arranged alternately with one or more stages of compressor stator vanes. Each of the compressor rotor blades comprises a root, a shank, a platform and an aerofoil. The compressor rotor blades are arranged circumferentially around a compressor rotor and the compressor rotor blades extend generally radially from the compressor rotor. The roots of the compressor rotor blades are located in axially, or circumferentially, extending slots in the periphery of a compressor rotor. The platforms of the compressor rotor blades together define the inner boundary of a portion of the flow path through the compressor. In an alternative arrangement the compressor rotor blades are integral with the compressor rotor and are either machined from a solid disc of metal or are friction welded, electron beam welded or electron beam welded to the compressor rotor.

The compressor rotor and the compressor rotor blades are surrounded by a compressor casing. A small gap, or clearance, is provided radially between the tips of the compressor rotor blades and the compressor casing. The compressor casing is provided with an abradable coating on its inner surface immediately around the tips of the compressor rotor blades. These abradable coatings wear preferentially relative to the material of the tips of the compressor rotor blades during engine service. The abradable coatings reduce over tip leakage between the tips of the compressor blades and the compressor casing and hence reduce the associated loss in engine efficiency and engine performance.

These abradable coatings generally comprise open, or closed, metallic foams. None of these metallic foams have an optimum combination of properties for an abradable coating to form a seal to reduce over tip leakage between the tips of the compressor blades and the compressor casing. Closed cell metallic foams provide excellent sealing capability, but are abrasive to the material of the blade tips due to their increased density. Closed cell metallic foams are also poorly controlled during manufacture, in terms of pore size and distribution within the metallic matrix, and this makes it difficult to predict abradability and the risk of titanium fire due to excessive wear of the blade tips of the compressor blades.

Accordingly the present invention seeks to provide a novel seal between relatively movable members, which reduces, preferably overcomes, the above-mentioned problem.

Accordingly the present invention provides a seal between first and second relatively movable members, the seal comprising an abradable material on at least one of the relatively movable members, the abradable material comprising an open cell metallic foam and polymeric films closing the cells of the metallic foam.

Preferably the first and second members are relatively rotatable members.

Preferably the first member is a rotor and the second member is a stator, the seal comprising an abradable material on at least one of the rotor and the stator.

Preferably the rotor comprises a plurality of rotor blades, the stator comprises a casing and the abradable material is arranged on the casing.

Alternatively the stator comprises a plurality of stator vanes and the abradable material is arranged on the stator vanes.

Preferably the rotor comprises a compressor rotor, the rotor blades are compressor blades and the casing is a compressor casing.

Preferably the rotor is a rotor of a gas turbine engine.

Alternatively the rotor and the stator are a rotor and a stator of a bearing.

Preferably the open cell metallic foam comprises nickel foam or nickel alloy foam.

Preferably the polymeric films comprise polyethylene, polypropylene, PTFE or PVC.

The present invention also provides a method of manufacturing a seal comprising forming an open cell metallic foam, dipping the open cell metallic foam in a molten polymer, removing the open cell metallic foam from the molten polymer, allowing excess molten polymer to drain from the open cell metallic foam to form thin polymeric films which close the cells of the metallic foam.

Preferably the open cell metallic foam comprises nickel foam or nickel alloy foam.

Preferably the polymer comprises polyethylene, polypropylene, PTFE or PVC.

The present invention will be more fully described by way of example with reference to the accompanying drawings in which.

Figure 1:
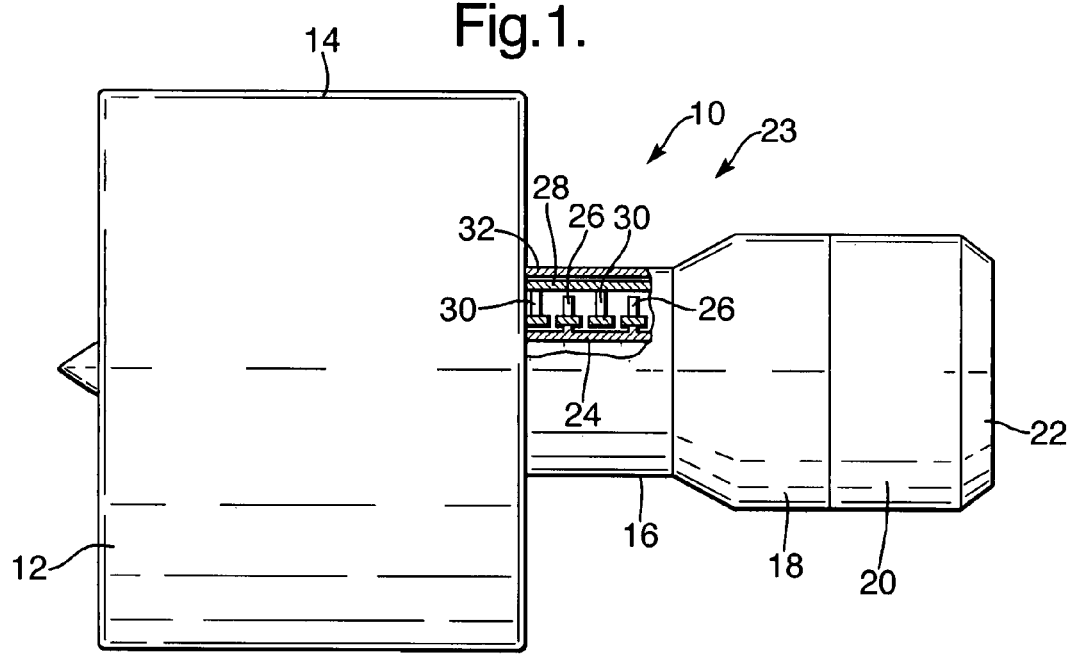
FIG. 1 shows a turbofan gas turbine engine having a seal between a rotor and a stator according to the present invention.

A turbofan gas turbine engine 10, as shown in FIG. 1, comprises in axial flow series an intake 12, a fan section 14, a compressor section 16, a combustion section 18, a turbine section 20 and a core exhaust 22. The turbine section 20 comprises a high-pressure turbine (not shown) arranged to drive a high-pressure compressor 23 in the compressor section 16, an intermediate pressure turbine (not shown) arranged to drive an intermediate pressure compressor (not shown) in the compressor section 16 and a low pressure turbine (not shown) arranged to drive a fan (not shown) in the fan section 14.

Figure 2:
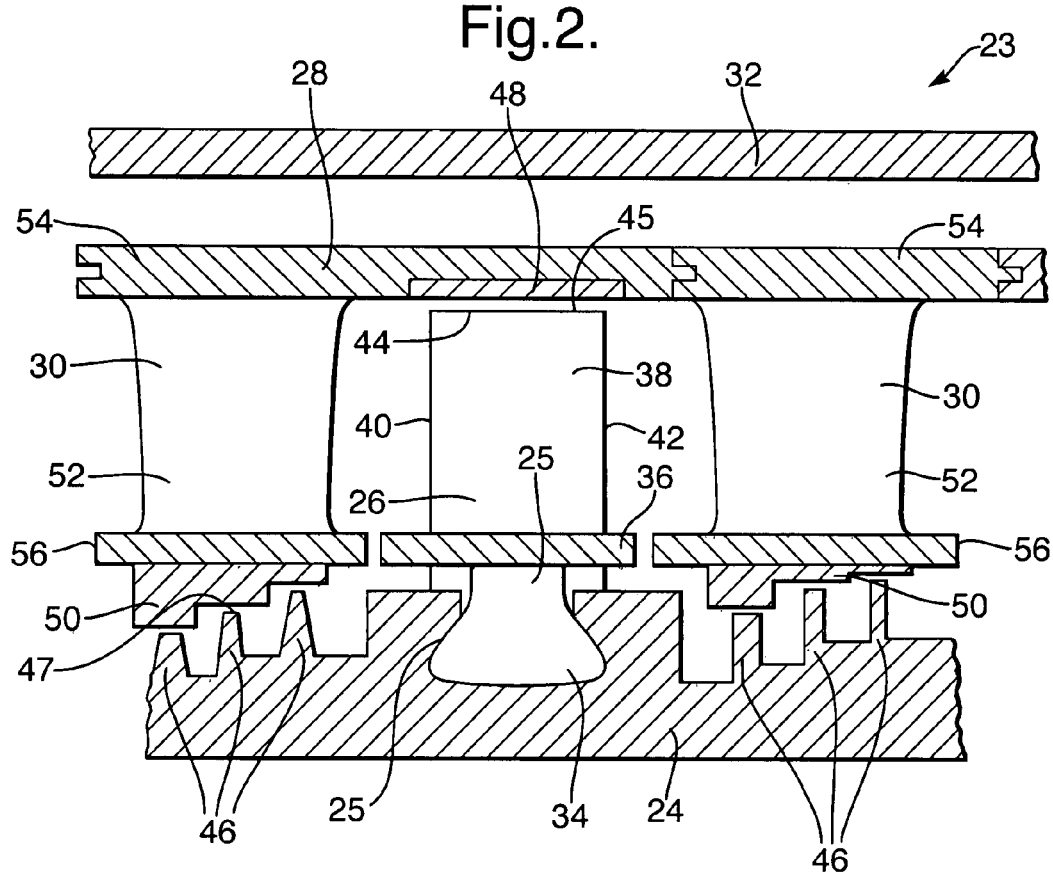
FIG. 2 shows is an enlarged view of a seal between a rotor blade and a stator casing and a seal between a stator vane and a rotor according to the present invention.

The high-pressure compressor 23 of the compressor section 16 is shown more clearly in FIG. 2. The high-pressure compressor 23 comprises one or more stages of compressor rotor blades 26 arranged alternately with one or more stages of compressor stator vanes 30. Each of the compressor rotor blades 26 comprises a root 34, a shank 25, a platform 36 and an aerofoil 38. The compressor rotor blades 26 are arranged circumferentially around a compressor rotor 24 and the compressor rotor blades 26 extend generally radially from the compressor rotor 24. The roots 34 of the compressor rotor blades 26 are located in circumferentially, or axially, extending slots 25 in the periphery of the compressor rotor 24. The platforms 36 of the compressor rotor blades 26 together define the inner boundary of a portion of the flow path through the high-pressure compressor 23. The aerofoils 38 of the compressor rotor blades 26 have leading edges 40, trailing edges 42 and tips 44 at their radially outer extremities.

Alternatively the compressor rotor blades 26 are integral with the compressor rotor 24 and are either machined from a solid disc of metal or are friction welded, electron beam welded or electron beam welded to the compressor rotor 24.

The compressor stator vanes 30 also comprise aerofoils 52, which have platforms 56 at their radially inner ends and shrouds 54 at their radially outer ends. The stator vanes 30 are also arranged circumferentially around the stator and extend generally radially. The shrouds 54 of the compressor stator vanes 30 are secured together to form a stator casing 28. A further outer stator casing 32 surrounds the stator casing 28.

The compressor rotor 24 also comprises one or more sealing fins 46, which extend generally radially outwardly from the compressor rotor 24 towards the platforms 56 of the stator vanes 30 to form a labyrinth seal.

A small gap, or clearance, 45 is provided radially between the tips 44 of the compressor rotor blades 26 and the compressor casing 28. The compressor casing 28 is provided with a seal 48, an abradable coating, on its inner surface immediately around the tips 44 of the compressor rotor blades 26.

These seals 48 are provided around each of the stages of the compressor rotor blades 26, between the tips 44 of the compressor rotor blades 26 and the stator casing 28. The seals 48 are carried on the shrouds 54 of the stator vanes 30. The seals 48 comprise an abradable material on the shrouds 54 of the stator vanes 30 of the stator casing 28.

A small gap, or clearance, 47 is provided radially between the tips of the sealing fins 46 and the platforms 56 of the stator vanes 30. The platforms 56 of the stator vanes 30 are provided with a seal 50, an abradable coating, on their inner surfaces immediately around the tips of the sealing fins 46.

The seals 50 are provided between the sealing fins 46 of the compressor rotor 24 and the platforms 56 of the stator vanes 30. The seals 50 are carried on the platforms 56 of the stator vanes 30. The seals 50 comprise an abradable material on the platforms 56 of the stator vanes 30.

Figure 3:
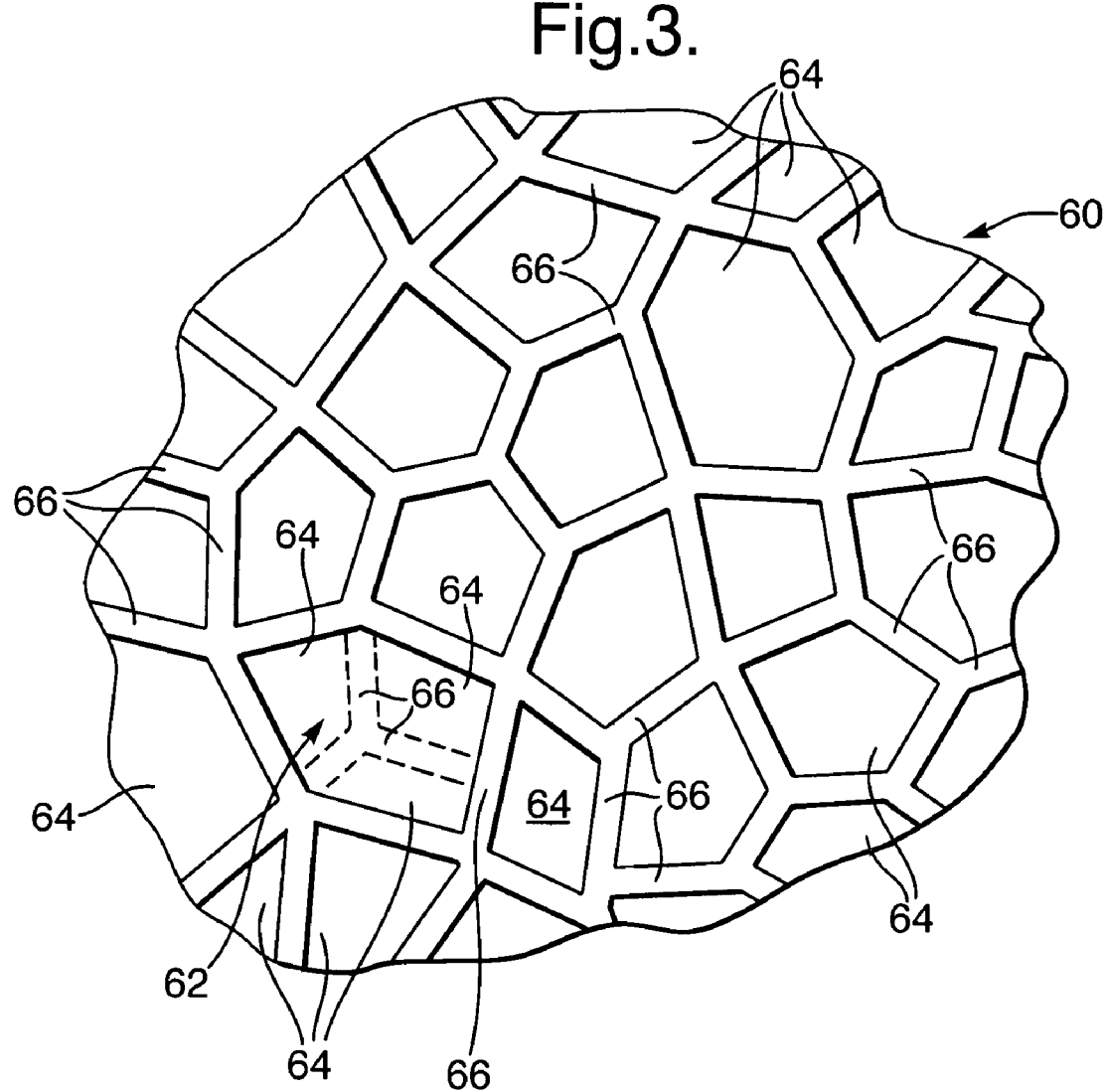
FIG. 3 shows is a further enlarged view of a seal between the rotor blade and a stator casing according to the present invention.

The abradable material of the seals 48 and 50, as shown more clearly in FIG. 3, comprises an open cell metallic foam 60 and polymeric films 64 closing the cells 62 of the metallic foam 60.

The abradable material of the seals 48 and 50 is manufactured by providing open cell metallic foam 60. The open cell metallic foam 60 preferably comprises nickel foam or nickel alloy foam (Incofoam®) and is manufactured in the usual manner, but other suitable metallic foams may be used. The resultant metallic foam 60 is highly porous and gas permeable. The open cell metallic foam 60 is dipped in a low viscosity, high surface tension, molten polymer. Suitable polymers for use at lower temperatures are polyethylene or polypropylene, in the lower pressure stages of the compressor, or PTFE or PVC in the higher pressure stages of the compressor. The metallic foam 60 is removed from the molten polymer and the excess polymer is allowed to drain from the metallic foam 60 to leave thin polymeric film 64 between the metallic matrix 66 of the metallic foam 60. The thickness and the number of the thin polymeric films 64 within the metallic foam 60 are controlled by the viscosity of the molten polymer. The resultant structure comprises metallic foam 60 and thin polymeric films 64, which close the open cells 62 of the metallic foam 60. Thus the thin polymeric films 64 provide limited or no gas permeability. The polymer does not fill the pores/cells 62 within the metallic foam 60 and therefore the resultant structure is deformable and abradable.

It may also be possible to manufacture the abradable material 50 comprising open cell metallic foam 60 and polymeric films 64 closing the cells 62 of the metallic foam 60 by spraying or painting liquid polymeric material onto the open cell metallic foam 60.

Thus the advantage of the present invention is that it combines the sealing properties of a closed cell metallic foam structure with the abradability and manufacturing control of an open cell metallic foam structure.

The abradable material may be used between any relatively rotating members where a good fluid seal, e.g. air or liquid seal, is required up to the operational temperature of the polymer.

Although the present invention has been described with reference to the seal and abradable material being provided on the stator it is equally possible to provide the abradable material on the rotor.

Although the present invention has been described with reference to a seal between compressor rotor blade tips and a compressor casing and between a rotor and stator vane platforms, it is equally applicable to a seal at other positions between a rotor and a stator of gas turbine engine or a turbomachine and may also be used as a seal between a rotor and a stator of a bearing.

The present invention may also be used between other relatively movable members.

I claim:

1. A seal between first and second relatively movable members, the seal comprising:
    an abradable material on at least one of the relatively movable members, the abradable material comprising an open cell metallic foam, the open cell metallic foam having a metallic matrix defining a plurality of open cells within the open cell metallic foam, and
    polymeric films closing the plurality of open cells,
    wherein the polymeric films cover areas between each of the cells in the metallic matrix, but do not fill the cells of the open cell metallic foam.

2. A seal as claimed in claim 1 wherein the first and second members are relatively rotatable members.

3. A seal as claimed in claim 2 wherein the first member is a rotor and the second member is a stator, the seal comprising an abradable material on at least one of the rotor and the stator.

4. A seal as claimed in claim 3 wherein the rotor comprises a plurality of rotor blades, the stator comprises a casing and the abradable material is arranged on the casing.

5. A seal as claimed in claim 3 wherein the stator comprises a plurality of stator vanes and the abradable material is arranged on the stator.

6. A compressor comprising:
    the seal as claimed in claim 4, wherein the rotor comprises a compressor rotor, the rotor blades are compressor blades and the casing is a compressor casing.

7. A seal as claimed in claim 3 wherein the rotor is a rotor of a gas turbine engine.

8. A seal as claimed in claim 1 wherein the open cell metallic foam is selected from the group comprising nickel foam and nickel alloy foam.

9. A seal as claimed in claim 1 wherein the polymeric films are selected from the group comprising polyethylene, polypropylene, PTFE and PVC.

10. A method of manufacturing a seal comprising:
    forming an open cell metallic foam having a metallic matrix defining a plurality of open cells within the open cell metallic foam,
    dipping the open cell metallic foam in a molten polymer,
    removing the open cell metallic foam from the molten polymer,
    allowing excess molten polymer to drain from the open cell metallic foam to form thin polymeric films which close the cells of the metallic foam, wherein the polymeric films cover areas between each of the cells in the metallic matrix, but do not fill the cells of the open cell metallic foam.

11. A method as claimed in claim 10 wherein the open cell metallic foam is selected from the group comprising nickel foam and nickel alloy foam.

12. A seal as claimed in claim 10 wherein the polymeric films is selected from the group comprising polyethylene, polypropylene, PTFE and PVC.

* * * * *